US008411947B2

(12) United States Patent
Attwood (10) Patent No.: US 8,411,947 B2
(45) Date of Patent: Apr. 2, 2013

(54) VIDEO PROCESSING TO DETECT MOVEMENT OF AN OBJECT IN THE SCENE

(75) Inventor: Charles I. Attwood, Worton Grange Reading (GB)

(73) Assignee: Thales Holdings UK PLC, Surrey (GB)

( * ) Notice: Subject to any disclaimer, the term of this patent is extended or adjusted under 35 U.S.C. 154(b) by 329 days.

(21) Appl. No.: 12/969,813

(22) Filed: Dec. 16, 2010

(65) Prior Publication Data

US 2011/0177841 A1 Jul. 21, 2011

(30) Foreign Application Priority Data

Dec. 16, 2009 (GB) .................................. 0921986.6

(51) Int. Cl.
*G06K 9/00* (2006.01)
(52) U.S. Cl. ....................................... 382/172; 382/168
(58) Field of Classification Search .................. None
See application file for complete search history.

(56) References Cited

U.S. PATENT DOCUMENTS

| | | | | |
|---|---|---|---|---|
| 5,809,171 | A * | 9/1998 | Neff et al. ..................... | 382/209 |
| 6,272,246 | B1 * | 8/2001 | Takai ............................ | 382/209 |
| 2001/0005430 | A1 * | 6/2001 | Warnick et al. ............... | 382/173 |
| 2006/0203098 | A1 | 9/2006 | Henninger et al. | |
| 2007/0268364 | A1 * | 11/2007 | Neff et al. ..................... | 348/143 |

FOREIGN PATENT DOCUMENTS

JP 2001245177 A 9/2001

OTHER PUBLICATIONS

Irena Koprinska, Sergio Carrato, "Temporal video segmentation: A survey". Signal Processing: Image Communication, vol. 16, No. 5. (Jan. 2001), pp. 477-500.*
Great Britain Search Report dated Feb. 11, 2010 in GB0921986.6 Patent Application.

* cited by examiner

*Primary Examiner* — Li Liu
(74) *Attorney, Agent, or Firm* — Stroock & Stroock & Lavan LLP (57) ABSTRACT

A method of processing video comprising a succession of images of a scene to detect movement of an object in the scene, comprising storing a matrix of bytes each representing the difference in intensity of a respective pixel between temporally adjacent images, creating from those bytes a histogram of the frequency at each of a range of positive and negative values of the intensity difference, locating the limits of a central peak of the frequency distribution in the histogram so as to include in the central peak changes due to illumination change and repetitive motions in the background of the scene, determining the proportion of bytes in the remainder of the distribution that are in tails of the distribution on each side of the central peak, repeating the aforesaid process for each successive pair of temporally adjacent images, and providing an output indicative of a moving object and not indicative of illumination change or repetitive motions, in the event that that proportion meets a predetermined criterion.

24 Claims, 6 Drawing Sheets

VIDEO PROCESSING TO DETECT MOVEMENT OF AN OBJECT IN THE SCENE

This application claims priority to UK Patent Application No. 0921986.6, filed Dec. 16, 2009, which is hereby incorporated by reference herein in its entirety.

This invention relates to a method and apparatus for processing video comprising a succession of images of a scene to detect movement of an object in the scene. The invention is applicable to surveillance systems, but also some other applications such as nature photography. The invention is especially useful as a low-computational cost vision system capable of performing basic motion detection, with a high degree of immunity to false alarms from illumination changes and from repetitive motion.

Conventional video motion detector systems alert an operator to intrusions into a monitored camera view or scene. Such systems are typically prone to false alarms caused by light changes, i.e. changes in the illumination of part of the scene or most of the scene. They also give rise to false alarms caused by repetitive motion such as moving foliage or waves. Accordingly, video motion detector systems were perceived as unreliable and of little practical use. The development of much more complex and computationally costly change detection algorithms, such as that disclosed in Stauffer C. & Grimson W. E. L. (2000) "*Adaptive background mixture models for real-time tracking*" PAMI 22(8), August pp. 747-757, and the so-called "mixture of Gaussians" method, led to a degree of robustness to slow light changes and to repetitive motion. These approaches generally process two-dimensional image data and are therefore memory- and computation-intensive requiring a personal computer to execute the data processing. Some surveillance requirements, for example covert monitoring situations where equipment cannot be powered by mains electricity, are therefore not well catered for, due to the energy costs of processing the image data.

Kim, B-G & Park, D-J (2004), "*Novel Thresholding Algorithm for change Detection in Video Sequence*", Letter to: IEICE Trans. Inf. & Syst., Vol. E87-D, No. 5. pp. 1271-1275 discloses a related approach to the problem. Global illumination changes, GIC, are modelled by examining intensity changes between a current image and a previous image. In estimating the GIC model, the authors attempt to exclude differences due to any objects in the scene, by using assumptions of symmetry and decreasing value in the distribution. Noise is modelled using the difference between a background, i.e. an empty scene or a reference image corrected by the GIC model, and the current image, and this value of difference serves as a threshold for change detection of moving objects. Local illumination changes, LIC, are detected by using a 7×7 pixel spatial window applied at each image pixel as part of a process for removing effects due to local illumination change. This two-dimensional spatial analysis is computationally costly, and the system is still incapable of ensuring immunity to other environmental changes.

Accordingly, the present invention provides a method of processing video comprising a succession of images of a scene to detect movement of an object in the scene, comprising storing a matrix of bytes each representing the difference in intensity of a respective pixel between temporally adjacent images, creating from those bytes a histogram of the frequency at each of a range of positive and negative values of the intensity difference, locating the limits of a central peak of the frequency distribution in the histogram so as to include in the central peak changes due to illumination change and repetitive motions in the background of the scene, determining the proportion of bytes in the remainder of the distribution that are in tails of the distribution on each side of the central peak, repeating the aforesaid process for each successive pair of temporally adjacent images, and providing an output indicative of a moving object and not indicative of illumination change or repetitive motions, in the event that that proportion meets a predetermined criterion.

The invention also provides video processor apparatus comprising means for receiving a succession of images of a scene to detect movement of an object in the scene, means for storing a matrix of bytes each representing the difference in intensity of a respective pixel between temporally adjacent images, and processing means arranged to create from those bytes a histogram of the frequency at each of a range of positive and negative values of the intensity difference, arranged to locate the limits of a central peak of the frequency distribution in the histogram so as to include in the central peak changes due to illumination change and repetitive motions in the background of the scene, arranged to determine the proportion of bytes in the remainder of the distribution that are in tails of the distribution on each side of the central peak, arranged to repeat the aforesaid process for each successive pair of temporally adjacent images, and arranged to provide an output indicative of a moving object in the event that that proportion meets a predetermined criterion.

The use of histogram processing, i.e. one-dimensional computer processing, in accordance with the invention greatly simplifies the computation required, and the invention also exploits various statistical properties of the illumination intensity distribution over the pixels of an image to enable different types of change to be identified and to provide immunity to false alarms from illumination changes and from repetitive motion.

In order that the invention may be better understood, a preferred embodiment will now be described, by way of example only, with reference to the accompanying drawings, in which.

A preferred method embodying the invention processes video comprising a succession of images of a scene, the video being supplied to a computer processor either from a previously-stored file containing archive video, or in real time from a camera or other image source. The data processor may be part of a device including the camera, or it may be remote from the image source, for example a PC linked to an image source over the Internet.

The low-computational cost method involves performing all image analysis in a one-dimensional domain. The only data input required for this is the frame-to-frame difference in intensity for each pixel in the current image compared with its corresponding pixel in the previous image. This can be achieved using "pointer" arithmetic, with the image pixel locations addressed as one-dimensional vector locations. No two-dimensional understanding or spatial analysis is needed. This signed (positive or negative) difference data is histogrammed, for example forming a one-dimensional array of 511 signed bytes in the case of an eight bit pixel camera image, and all scene understanding derives from an analysis of the shape and behaviour of the one-dimensional distribution or histogram.

Figure 1A:
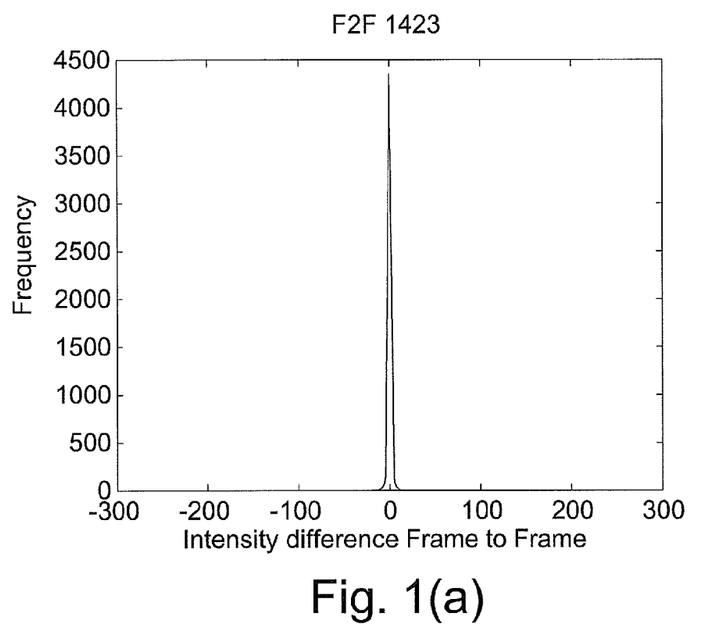
FIGS. 1a to 1d are histograms of successive adjacent image frames of the same scene, plotting numerical frequency against positive or negative intensity difference for the pixels of the scene, from one image frame to the next.

With reference to FIG. 1a, the set of values generated by the difference between two temporally adjacent intensity images produces a distribution that is modelled well by a double exponential or Laplacian. This distribution is represented by the formula (1) below:

$$f(x) = \frac{1}{2\phi}\exp\left(-\frac{|x|}{\phi}\right), \quad -\infty < x < \infty, \qquad 1.$$

where ø is a positive parameter.

The histogram has a pointed peak with its location defined by the median, and it has fat tails on the positive and negative sides.

Figure 1B:
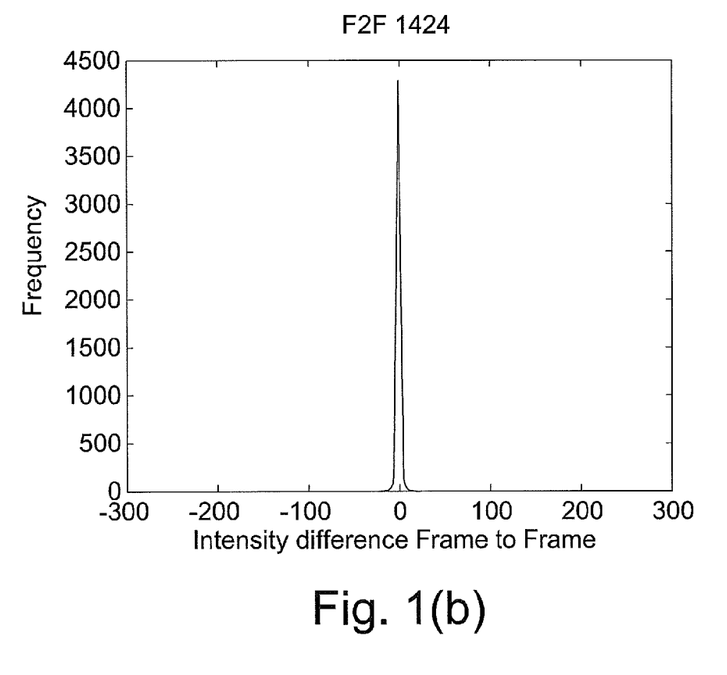

If there has been no object motion and no light change in the scene in the short interval between capturing the two images, then the variations in value will be due only to the noise characteristics of the processes involved in the digital image capture. These noise processes have a zero mean, with increasing deviations from that mean being of decreasing likelihood. In other words, the region of the difference histogram occupied by the central peak corresponds to areas of the image that are empty scene areas, devoid of any changes caused by new events in the scene. By way of example, the scene changes shown in FIGS. 1a and 1b, which relate to three temporally adjacent scenes (i.e. the differences between the first and second and between the second and third scenes) indicate the absence of illumination change.

Figure 1C:
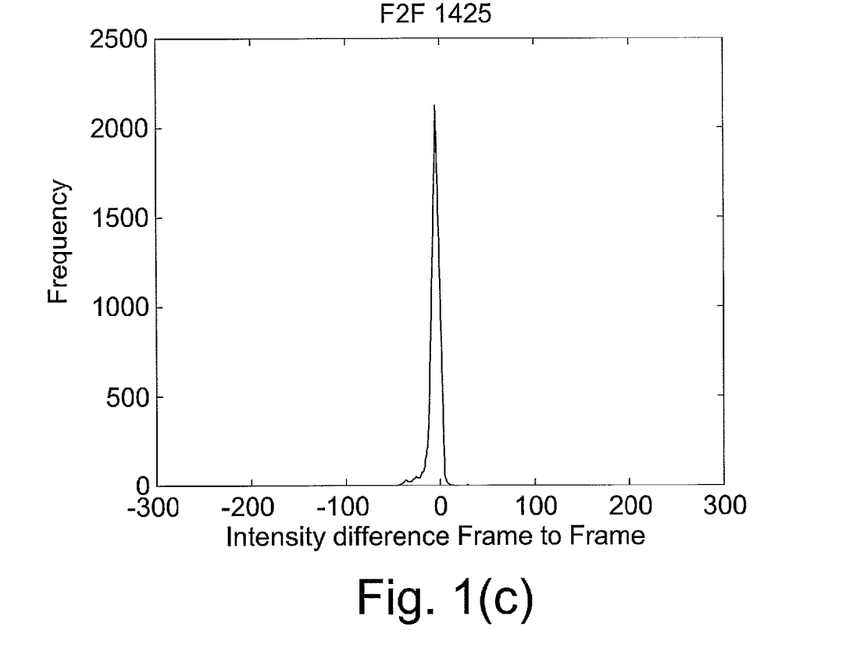
Figure 1D:
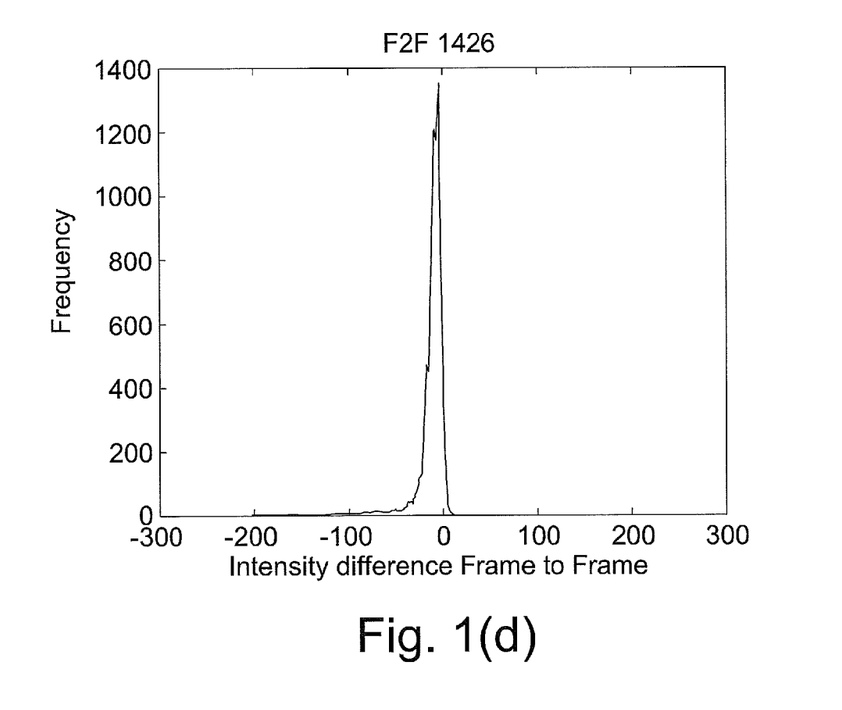

Regions of the histogram close to and adjoining the central peak tend to correspond to local illumination change, LIC, since the variation in the light intensity change will naturally range from zero to the maximum change level of the pool of light, and will thus be joined to the central distribution, where it can be detected as an asymmetry in the central peak. Examples of this are shown in the histograms of FIGS. 1c and 1d, which are temporally adjacent.

Global illumination changes, GIC, will tend to affect all the image pixels equally, causing a shift of the central peak, either in the positive direction if the scene is brighter, or in the negative direction if it is darker. In some scenes, global light changes will not affect some small areas, which are shadowed or otherwise unaffected by the change, this leading to more complex histogram profiles.

Moving objects tend to introduce frame-to-frame pixel intensity values which are quite different from the background, with correspondingly larger pixel intensity changes, and these therefore tend to lie in the tails of the distribution.

Objects in a scene which are moving with a repetitive motion, such as the waves of an ocean scene, or the leaves of a tree moving in the wind, will tend to reveal the static background which they normally occlude. Provided the alternating values of pixels affected by this motion are of relative similar intensity value, i.e. sometimes lighter and sometimes darker, the effect on the difference histogram will be to thicken the central peak, compared with the same scene and the same digital image capture process.

Accordingly, the method embodying the invention which analyses the histograms is capable of identifying local illumination changes as an asymmetry in the central distribution, and is capable of ignoring global light changes by taking account of any shift induced in the central peak. The method can detect the motion of foreground objects, i.e. intruders or perhaps animals in a background nature scene, by assessing the proportion of outliers in the tails of the distribution relative to the central peak or the total. The method can eliminate repetitive motions, such as waves and foliage, as these tend to cancel each other out, keeping the peak symmetrical. Having said that, it has to be acknowledged that repetitive motion increases the spread of the distribution, dependant on the contrast between foreground and background of moving regions, and can reduce the sensitivity to the detection of low-contrast moving objects. In static scenes, i.e. those without repetitive motion, the detection of moving objects is highly sensitive, even under low contrast conditions.

The computational analysis of each histogram will now be described further with reference to FIGS. 2 to 4.

Figure 2:
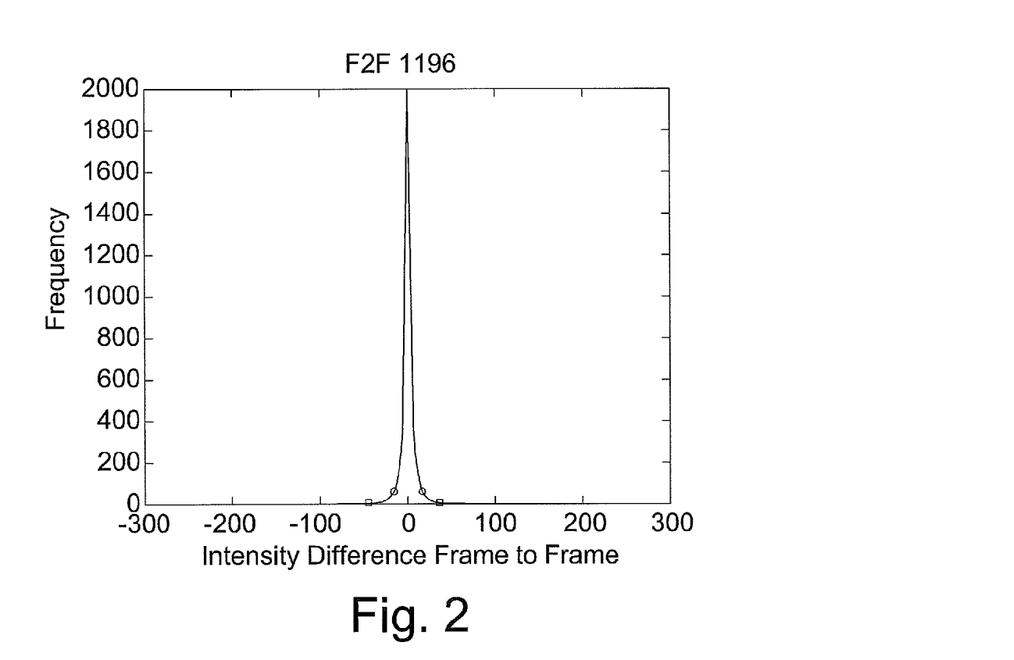
FIGS. 2 and 3 are further examples of a histogram of intensity difference corresponding to FIGS. 1a to 1d, but for an empty scene with a large amount of moving foliage and changing sunlight patches, FIG. 2 without a moving vehicle and FIG. 3 with a moving vehicle present.
Figure 3:
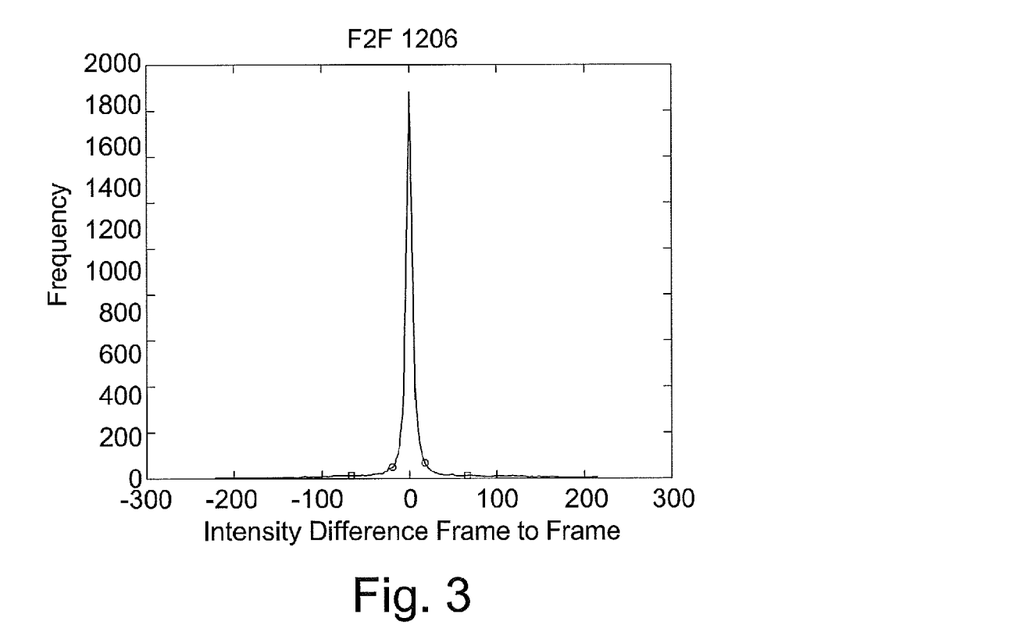

In FIGS. 2 and 3, the intensity differences lie within the range of −255 to +255 for eight bit pixels, and the peak is normally located at zero intensity, if no global illumination change has occurred. By making the assumption that there has been no global illumination change, the peak is located at zero intensity. If then the peak shifts from zero, the program assumes that there has been a global illumination change, and such data is ignored. In particular, the data cannot be used for testing the symmetry of the central peak.

The proportion of outliers in the tails of the distribution relative to the total number of pixels requires the program to identify the position of the cusps L1, L2 in FIG. 2 of the distribution. It also requires some thresholding for cutting off the tails where the frequency has dropped close to zero but not quite to zero. In FIGS. 2 and 3, the positions of the cusps L1, L2 are shown with circles, and the positions of the outlier thresholds are shown with squares. Accordingly, as shown in FIG. 3, the width W of the central peak is the distance between the cusps L1, L2; and the intensity difference value of the outlier threshold O, in this embodiment, is a predetermined multiple of the peak width W, O=1.75 W.

Figure 4:
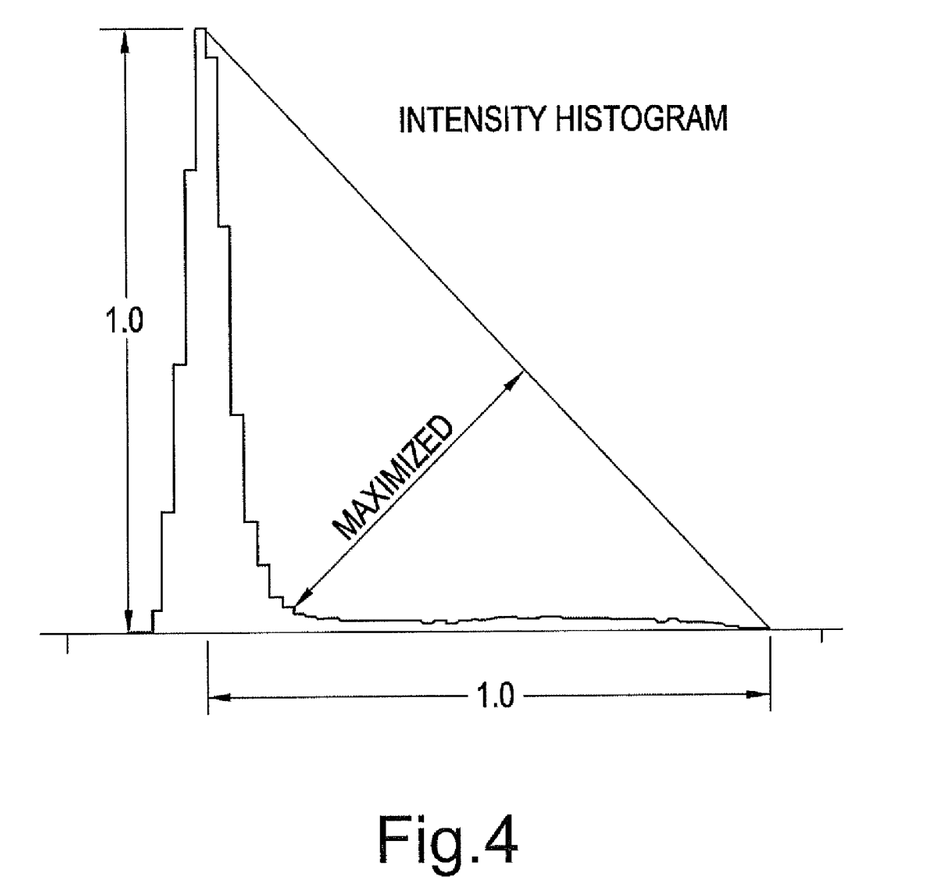
FIG. 4 is a diagram of a histogram corresponding to FIGS. 1 to 3 and illustrating a triangulation method for determining the position of a cusp of the Laplacian distribution.

With reference to FIG. 4, the method disclosed in Zack, G. W. Rogers, W. E. and Latt, S. A., (1977) "*Automatic Measurement of Sister Chromatid Exchange Frequency*" Journal of Histochemistry and Cytochemistry 25 (7), pp. 741-753 is used by the program to identify the cusp positions L1, L2. First, the histogram is normalised so that the distribution extends equal lengths from zero along each axis. The length along the frequency difference axis is that between the peak and the point at which the distribution has fallen first to zero. A hypothetical hypotenuse is then drawn to form an isosceles triangle as shown, between the top of the distribution peak at one end and the distribution zero point at the other end. The cusp on this side of the distribution is then taken to be the point at which the perpendicular distance between the curve and the hypotenuse is the maximum.

This triangle algorithm of Zack et al has the benefit of working well with noisy data, although a single pass of a noise-smoothing filter is applied to the histogram prior to cusp location, to further increase accuracy. This is essentially a peak-preserving smoothing filter. In this implementation, the particular method chosen is a forward and reverse (zero phase), FIR filter with 5 normalised coefficients. The profile of the coefficients form a "triangle" e.g. [1 2 3 2 1]/9. The filter could perhaps be more efficiently implemented as two convolutions of a set of "rectangular" profile coefficients. The aim is to smooth out noise that might otherwise cause small scale minima, that can affect the best larger scale estimate of the location of the cusps found in Zack's (1977) Triangle algorithm.

The values of L1 and L2 are stored for successive frames, and typically are averaged over the previous 50 frames for reliability. Thus for any given frame, the point at which the tails end and the central peak begins is selected using a model of the statistical distribution of the two signed cusp location values over the previous 50 frames.

Figure 5:
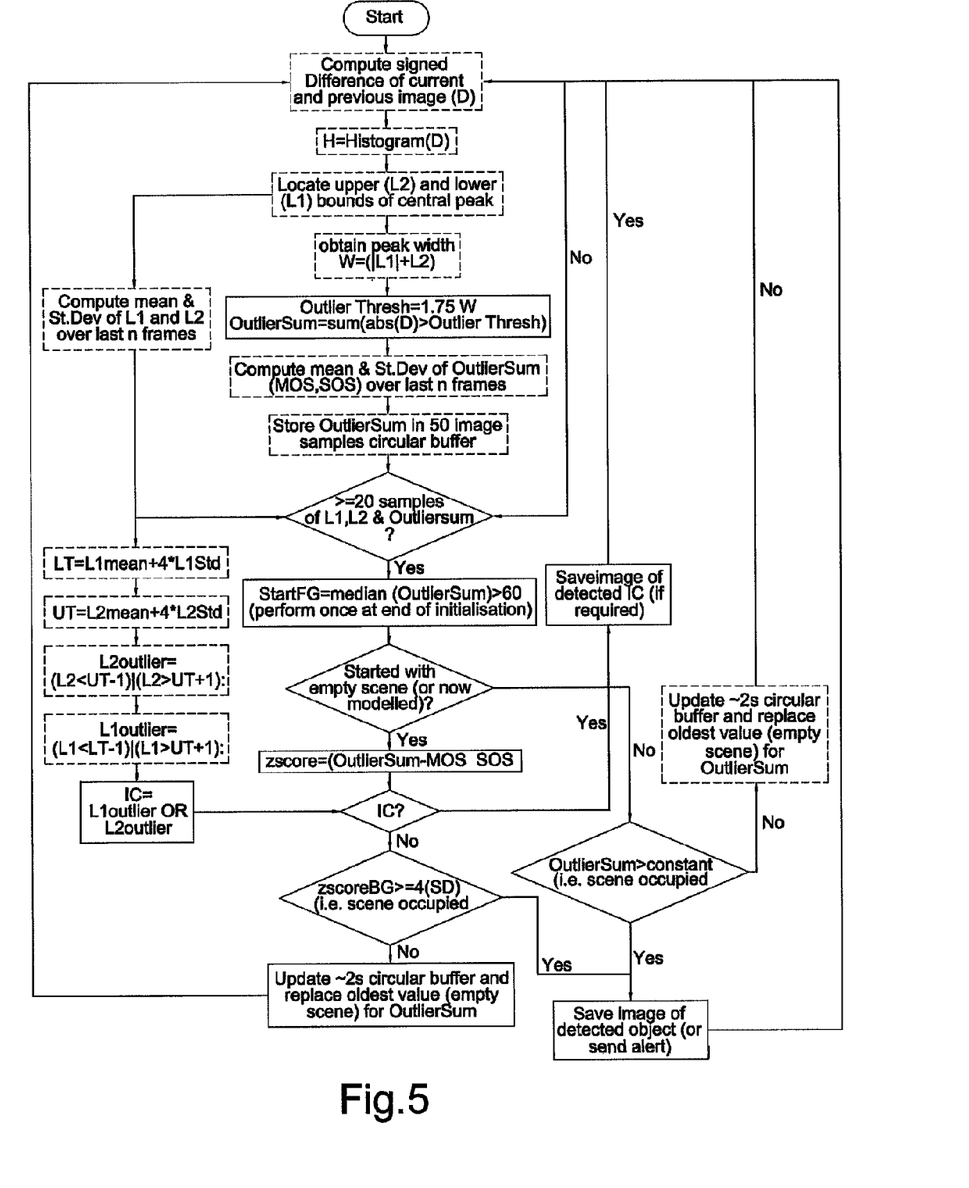
FIG. 5 is a flow chart illustrating the operation of a preferred embodiment of the invention.

The process embodying the invention is illustrated in the flow chart of FIG. 5, although it will be appreciated that alternative statistical approaches could be used instead. FIG. 5 illustrates how the system is designed to "bootstrap" itself, i.e. to learn all the necessary parameters without any operator intervention.

The current input camera image is subtracted from the stored previous input image, and the signed difference for each pixel pair in illuminance is derived as a number and is transferred into a 511 bin (over a range −255 to +255) histogram. Only two images need to be stored for computational purposes at any given time, although as previously indicated, the positions of the cusps L1 and L2 and other data are stored over multiple images.

Once the histogram has been formed, the upper and lower bounds L1, L2 of the central peak are located using the algorithm of FIG. 4, and from these the width of the central peak W is determined. From this, each outlier threshold is determined as O=1.75 W. Thus an initial sample of the width of the central peak is collected, this being roughly equivalent to an estimate of the amount of variation or noise in pixels constituting the background of the scene.

The values of L1 and L2 are stored in two separate circular buffers, and the mean and standard deviation of each cusp set is computed for each new image. If the current value is greater than the mean plus four standard deviations, either for L1 or for L2 or for both L1 and L2, then the current image is taken to contain an illumination change compared with the previous image. When an illumination change is assumed to have occurred, the pixels of the background distribution are brightened or darkened. This change is represented in the difference histogram by a sudden asymmetrical fattening of one or other side of the central peak (local illumination change) or both sides (global illumination change). In either case, the test whether the current value is greater than the mean plus four standard deviations will detect the presence of an illumination change. If an illumination change occurs, the system will omit performing moving object tests on the current image, since these would be rendered unreliable during the light change. If an illumination change, IC, has occurred, then the image which created the light change could be stored or could be sent as an alert message, especially if the scene is one, such as an indoor scene, where light levels are not expected to change. In natural scenes, sudden light changes are quite infrequent and they normally occur for a fraction of a second, so this system is unlikely to miss the presence of a moving object in the scene for more than a fraction of a second.

The outlier threshold is computed as 1.75 W, and is used to detect the number of pixels which are considered to be outliers, i.e. clearly within the tails and not part of the central peak. As an alternative, the outlier threshold may be found for each tail of the distribution by locating the first point, searching from the peak outwards, at which the smoothed frequency value has dropped below 3.5.

Accordingly, the number of pixels in the positive and negative tails but within the outlier thresholds is determined, and is stored as the variable "Outlier Sum", for each new image. During the initialisation phase, the mean outlier sum, MOS, and the standard deviation outlier sum, SOS, are calculated, using a circular buffer of historical values of outlier sum, with a maximum length of 50 samples. New values replace the oldest values stored after 50 samples have been obtained. The values of outlier sum are approximately normally distributed over a sampling time period.

Next, a further number of image pairs are analysed, this number being greater than or equal to 20, which is considered to be a sufficient number, equivalent to a time period of about 0.8 second at 25 frames per second. Following this analysis, the system is considered to be initialised.

FIGS. 2 and 3 illustrate the application of the system to a complex scene in nature which has a large amount of moving foliage and changing sunlight patches. In FIG. 2, the scene is empty but in FIG. 3 a moving vehicle is present. Comparing FIG. 3 with FIG. 2, it can be seen that the moving vehicle has caused the tails to be extended, increasing the value of Outlier Sum due to the presence of the moving object.

At the end of the initialisation process, a test is performed once to decide if the sequence just modelled was from an empty background scene, or from one containing foreground objects. Extensive tests have shown that the detection of empty scenes, as opposed to occupied scenes, is more accurate and reliable if it is based on the testing of a new image against a statistical model of the normal empty scene. The median value of Outlier Sum, over the initial sampling period, is tested to see if it is greater than a fixed constant value, in this example the constant value being 60; if it is greater, then this is taken to indicate that the initialisation was in a period containing moving objects. If however the median value of Outlier Sum is less than or equal to 60, it is assumed to indicate that the initialisation was in a period containing only an empty scene, and/or changes only due to light or repetitive motion of foliage etc.

If the initialisation phase contained moving objects, then future tests for the presence of moving objects use the same test, until a sample of empty scene scores for Outlier Sum have been collected and modelled (a sufficient sample being greater than or equal to 3) to compute the mean $\mu$ and standard deviation $\sigma$. At this point, subsequent tests are based on the most recent empty scene Outlier Sum sample set, contained in the circular buffer.

A test for the deviation from the modelling background value of the Outlier Sum value x of a new image is therefore possible using a formula for a z score as follows:

$$z = \frac{(x - \mu)}{\sigma} \qquad 2.$$

The presence of moving objects is therefore performed using a test for a z score greater than 4, i.e. four standard deviations, or a probability value p less than 0.000032. This low probability is needed due to the large number of samples generated by images arriving at 25 frames per second, and it corresponds to the expected odds of approximately one event every 20 minutes.

When an image that contains moving objects is identified, this event is used either to raise an alert, or to store or send an example image to a chosen destination, which could be local to the device the system is embodied in, or via a local network, or to a remote communications bearer such as the mobile telephone network.

For each subsequent frame a number of tests are performed:

If the peak location is non-zero this is normally evidence that a Global Illumination change has occurred. Occasionally however, a very large object may distort the distribution and cause a peak shift, or a local illumination change might have occurred which was not correctly detected. In this case the symmetry of the peak should remain unchanged. To test these cases, if the peak shift is within the range ±1, the difference in absolute value for the tails thresholds adjusted (divided) by their distance apart is computed. A low ratio therefore indicates symmetry. A simple test against a constant ratio test value (0.15 worked in tests) is performed that picks up any significant asymmetry. If this test finds no asymmetry but a foreground test (see below) succeeds, the global illumination change classification is revoked, otherwise it succeeds.

The previous n frames' values (typical embodiment, n=50) are stored with new ones replacing the oldest, so that the system constantly adapts to current conditions.

Figure 6:
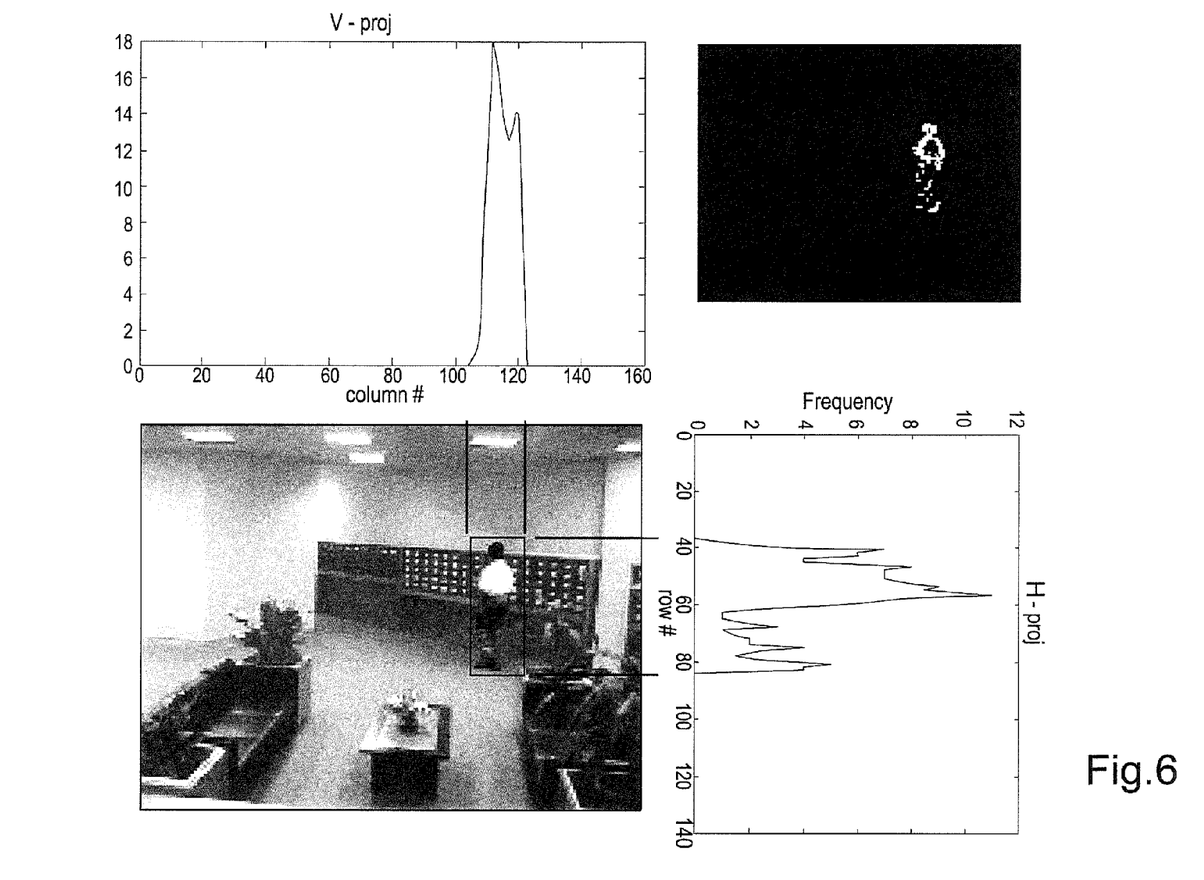
FIG. 6 illustrates the application of the invention to a scene and the use of a foreground mask.

If a particular application requires automatic object location within a scene, this can be added in a low-computational cost form for low occupancy scenes, by a simple threshold of the difference image at the threshold values found as 'tail-ends threshold' to create a motion mask. Then find the horizontal and vertical projection of the above threshold mask pixels (a simple summation across rows and then columns). A single pass algorithm is applied to bridge gaps between non-zero bins up to 2 pixels wide. The edges of connected pixel columns in each projection then give a bounding box on any moving objects. FIG. 6 shows an example of a foreground mask (top right) and the horizontal and vertical projection (top-right and bottom-left images) of mask pixels (top right image) allow a bounding box for an object detected in a scene to be generated (bottom-left image overlay). This can be extended to handle multiple objects, provided that the objects are separable after projection in at least one of the two orthogonal projections. In cases where objects overlap at an angle in both projections, the method will group such overlapping objects into a single bounding box. This is not too much of a limitation since this only occurs where the objects are very close together.

Given the computational savings in the 1D methods, the position in the image of any detected moving objects can be located using a standard connected component labelling process (e.g. Samet, H.; Tamminen, M.; (1988) *"Efficient component labelling of images of arbitrary dimension represented by liner bintrees"*. Pattern analysis and Machine Intelligence, IEEE Transactions on, Volume 10, Issue 4, pp. 579-586) applied to the binarised image. These locations could also be tested to see if they correspond to areas of particular interest, as specified perhaps via an initial definition via an optional setup user interface.

If a little more computational capacity exists in an application a more accurate foreground mask could be generated by maintaining a simple background image, simply using the last empty scene frame (after the last IC or foreground activity occurred). The thresholded difference mask formed from this simple background image and the current image, could be used to generate labelled pixel regions using simple connected-component labelling.

The system may be used for situation monitoring, suitable in particular when a scene is expected to normally be empty of moving structural objects (e.g. people or vehicles); or where the scene may be subject to artificial or natural lighting changes, or where the scene may contain repetitive motion from wind-blown foliage, waves, snow, etc. No installation or set-up of the camera system is needed—it adapts to changes in environment. It can be implemented with a very low computational cost, giving low power consumption and long battery-powered deployment capability. A low-end, low-cost Digital Signal Processing (DSP) chip would be adequate for all processing allowing potential for disposable camera systems.

Uses and applications include (but are not limited to):
Installation in a mobile phone, with suitable power saving measures (low frame rate, low resolution, power standby in darkness, etc) which would provide a security system that could be used by average household consumers to protect their goods or privacy, or the core mobile technology could be customised for professional uses. Text, images or clips could be sent as alerts to a system owner. It is also possible that the invention could be created as a mobile phone (with embedded camera) application distributed over the Internet, designed to work with specific phone models, where the phone's published Application Programming Interface allows access to and control of the camera function. If used in a domestic setting, an external dc power supply would give unlimited periods of use. If used away from power sources, efficient mobile DSPs and power management could give it a usable operational surveillance period. Potentially, the surveillance concept could be sold in high volumes as a low-cost mobile-phone application—even as a novelty.

"Shot detection" (used to segment large archived videos into scenes, for content-based retrieval). This might suit large search engine companies wanting to 'chunk' video into scenes or cuts, given the volume of video data on the world wide web, the need for very low computational cost solutions, and the need for it to differentiate between light changes and repetitive motions and actual changes of camera view, or scene contents.

Monitoring government or industrial buildings/warehouses that have low occupancy, or have restricted areas, but where it is important to know if entry into a zone has occurred.

Time lapse nature photography, where a high-resolution camera needs triggering when an animal enters its view, but not when light changes occur.

"Scatter cameras" in the MIT "forest of sensors" mode of use, in which low cost sensors are dropped or deployed rapidly over a wide area, which with ad hoc mesh wireless networking (or mobile communications) allows surveillance (e.g. intrusion detection) to be performed.

Force Protection: where a soldier might want to be made aware of any object or person-based movement in their vicinity whilst resting or eating. Personal mobile phones are known to have significant usage by military personnel and the present invention running as an approved application in an approved device could be of great use.

The invention claimed is:

1. A method of processing video comprising a succession of images of a scene to detect movement of an object in the scene, comprising storing a matrix of bytes each representing the difference in intensity of a respective pixel between temporally adjacent images, creating from those bytes a histogram of the frequency at each of a range of positive and negative values of the intensity difference, locating the limits of a central peak of the frequency distribution in the histogram so as to include in the central peak changes due to illumination change and repetitive motions in the background of the scene, determining the proportion of bytes in the remainder of the distribution that are in tails of the distribution on each side of the central peak, repeating the aforesaid process for each successive pair of temporally adjacent images, and providing an output indicative of a moving object and not indicative of illumination change or repetitive motions, in the event that that proportion meets a predetermined criterion.

2. A method according to claim 1, in which the predetermined criterion is that the proportion exceeds a predetermined threshold which is a function of previously-stored values of that proportion from a multiplicity of scene images.

3. A method according to claim 1, comprising ignoring data from images for which the central peak of the distribution has shifted from zero intensity change, this being caused by a global intensity change in the image.

4. A method according to claim 1, comprising ignoring data from images for which the degree of lateral asymmetry in the central peak of the distribution is greater than a predetermined threshold, this being caused by a local intensity change in part of the image.

5. A method according to claim 1, comprising providing an output indicative of there being a local illumination change in part of the image in the event that the degree of lateral asymmetry in the central peak of the distribution is greater than a predetermined threshold.

6. A method according to claim 1, comprising, for each matrix of bytes, storing the positive and negative intensity difference values at cusps of the distribution, the position of the cusps being determined by a predetermined algorithm, and determining the current position of the cusps, for use in counting the proportion of bytes in the tails, from at least one of the stored pairs of difference intensity values.

7. A method according to claim 6, in which the current position of the cusps is determined from a multiplicity of previous stored pairs of difference intensity values.

8. A method according to claim 6, in which the algorithm comprises, for each of the positive and negative sides, identifying as the cusp the point on the distribution which is furthest perpendicularly from a hypotenuse of an isosceles triangle drawn hypothetically between the top of the centre peak and the point on the zero frequency axis at which the distribution becomes zero, with the distribution normalised such that the height of the centre peak equals the width along the zero frequency axis between maximum and zero intensity, or minimum and zero intensity, as the case may be.

9. A method according to claim 6, in which the algorithm comprises a noise smoothing filter process.

10. A method according to claim 6, comprising, for each matrix of bytes, determining the maximum and minimum intensity difference values of the distribution tails as a predetermined function of the values at the cusps of the distribution.

11. A method according to claim 10, in which the predetermined function is a predetermined multiple of the intensity difference at the cusp.

12. A method according to claim 11, in which the predetermined multiple is substantially 1.75.

13. A method according to claim 6, comprising, for each matrix of bytes, determining the maximum and minimum intensity difference values of the distribution tails as those values at which the frequency is a predetermined value.

14. A method according to claim 13, in which the predetermined frequency value is 3.5.

15. A method according to claim 1, performed by a mobile telephone comprising a camera for obtaining the video, and comprising the step of sending a message containing the output.

16. A method according to claim 1, in which the entire video sequence is previously stored, and the output is indicative of portions of interest in the video sequence.

17. A method according to claim 1, wherein the moving object comprises an intruder.

18. A method according to claim 1, further comprising:
photographing moving objects entering a scene;
providing the output indicative of the presence of the moving object; and
using the output to trigger the operation of the camera.

19. A method according to claim 1, further comprising:
surveying an area using multiple distributed cameras communicating with each other on a network; and
providing outputs for each of the scenes observed by the respective cameras.

20. Video processor apparatus comprising means for receiving a succession of images of a scene to detect movement of an object in the scene, means for storing a matrix of bytes each representing the difference in intensity of a respective pixel between temporally adjacent images, and processing means arranged to create from those bytes a histogram of the frequency at each of a range of positive and negative values of the intensity difference, arranged to locate the limits of a central peak of the frequency distribution in the histogram so as to include in the central peak changes due to illumination change and repetitive motions in the background of the scene, arranged to determine the proportion of bytes in the remainder of the distribution that are in tails of the distribution on each side of the central peak, arranged to repeat the aforesaid process for each successive pair of temporally adjacent images, and arranged to provide an output indicative of a moving object in the event that that proportion meets a predetermined criterion.

21. Video processor apparatus according to claim 20, configured to process video comprising a succession of images of a scene to detect movement of an object in the scene, by performing a method comprising the steps of:
storing a matrix of bytes each representing the difference in intensity of a respective pixel between temporally adjacent images;
creating from those bytes a histogram of the frequency at each of a range of positive and negative values of the intensity difference;
locating the limits of a central peak of the frequency distribution in the histogram so as to include in the central peak changes due to illumination change and repetitive motions in the background of the scene;
determining the proportion of bytes in the remainder of the distribution that are in tails of the distribution on each side of the central peak;
repeating the aforesaid process for each successive pair of temporally adjacent images; and
providing an output indicative of a moving object and not indicative of illumination change or repetitive motions, in the event that that proportion meets a predetermined criterion,
wherein the predetermined criterion is that the proportion exceeds a predetermined threshold which is a function of previously-stored values of that proportion from a multiplicity of scene images.

22. A mobile telephone comprising:
a camera for producing a succession of images of a scene; and
a processor arranged to receive those images and to process them to detect movement of an object in the scene, the processor configured to operate according to a method comprising the steps of
storing a matrix of bytes each representing the difference in intensity of a respective pixel between temporally adjacent images, creating from those bytes a histogram of the frequency at each of a range of positive and negative values of the intensity difference, locating the limits of a central peak of the frequency distribution in the histogram so as to include in the central peak changes due to illumination change and repetitive motions in the background of the scene, determining the proportion of bytes in the remainder of the distribution that are in tails of the distribution on each side of the central peak, repeating the aforesaid process for each successive pair of temporally adjacent images, and providing an output indicative of a moving object and not indicative of illumination change or repetitive motions, in the event that that proportion meets a predetermined criterion.

23. A mobile telephone according to claim 22, arranged to send a message containing the said output.

24. An apparatus comprising:

a data processor; and a data storage coupled to the data processor, wherein the data storage stores a program which causes the data processor to carry out a method comprising the steps of:

storing a matrix of bytes each representing the difference in intensity of a respective pixel between temporally adjacent images, creating from those bytes a histogram of the frequency at each of a range of positive and negative values of the intensity difference, locating the limits of a central peak of the frequency distribution in the histogram so as to include in the central peak changes due to illumination change and repetitive motions in the background of the scene, determining the proportion of bytes in the remainder of the distribution that are in tails of the distribution on each side of the central peak, repeating the aforesaid process for each successive pair of temporally adjacent images, and providing an output indicative of a moving object and not indicative of illumination change or repetitive motions, in the event that that proportion meets a predetermined criterion.

* * * * *